(12) United States Patent
Pavliscak et al.

(10) Patent No.: US 7,730,746 B1
(45) Date of Patent: Jun. 8, 2010

(54) APPARATUS TO PREPARE DISCRETE HOLLOW MICROSPHERE DROPLETS

(75) Inventors: Thomas J. Pavliscak, Palos Verdes, CA (US); Carol Ann Wedding, Toledo, OH (US)

(73) Assignee: Imaging Systems Technology, Toledo, OH (US)

( * ) Notice: Subject to any disclaimer, the term of this patent is extended or adjusted under 35 U.S.C. 154(b) by 564 days.

(21) Appl. No.: 11/482,948

(22) Filed: Jul. 10, 2006

Related U.S. Application Data

(60) Provisional application No. 60/698,955, filed on Jul. 14, 2005.

(51) Int. Cl.
*C03B 7/00* (2006.01)
*B22D 11/01* (2006.01)
*B22F 9/00* (2006.01)

(52) U.S. Cl. .................. 65/329; 65/324; 65/21.2; 65/21.4; 264/4; 75/331; 75/335; 75/336; 425/7

(58) Field of Classification Search .......... 65/439, 65/494, 21.1–21.5, 324–333; 264/4–4.7, 264/5, 9, 10; 425/5–7; 75/331, 335–336, 75/338–339
See application file for complete search history.

(56) References Cited

U.S. PATENT DOCUMENTS

| | | | |
|---|---|---|---|
| 2,187,432 A | 1/1940 | Powers | |
| 2,644,113 A | 6/1953 | Etzkom | |
| 3,264,073 A | 8/1966 | Schmitt et al. | |
| 3,365,315 A | 1/1968 | Beck et al. | |
| 3,528,809 A | 9/1970 | Farnand et al. | |
| 3,607,169 A | 9/1971 | Coxe | |
| 3,646,384 A | 2/1972 | Lay | |
| 3,652,891 A | 3/1972 | Janning | |
| 3,666,981 A | 5/1972 | Lay | |
| 3,674,461 A | 7/1972 | Farnand et al. | |
| 3,699,050 A | 10/1972 | Henderson | |
| 3,794,503 A | 1/1974 | Netting | |
| 3,793,041 A | 2/1974 | Sowman | |
| 3,796,777 A | 3/1974 | Netting | |
| 3,811,061 A | 5/1974 | Nakayama et al. | |
| 3,838,998 A | 10/1974 | Matthews et al. | |
| 3,848,248 A | 11/1974 | MacIntyre | |
| 3,855,951 A * | 12/1974 | Giles | 110/216 |
| 386,086 A | 1/1975 | Mayer | |
| 3,885,195 A | 5/1975 | Amano | |
| 3,888,957 A | 6/1975 | Netting | |
| 3,916,584 A | 11/1975 | Howard et al. | |

(Continued)

*Primary Examiner*—Steven P Griffin
*Assistant Examiner*—Jodi Cohen
(74) *Attorney, Agent, or Firm*—Donald K Wedding

(57) ABSTRACT

Apparatus to eject on demand discrete hollow microsphere droplets that are characterized by a highly regular and predictable spherical shape, devoid of tails or other irregularities common in the prior art with a selected pure gas contained in the center. With this method and apparatus, droplets may be formed of any suitable material including glass, ceramic, plastic, or metal. A variety of gases at various pressures including complete vacuums may be contained in the hollow microsphere. Microspheres filled with ionizable gas may be used as pixels in a plasma display panel. Microspheres used as a pixel elements may be referred to as Plasma-spheres. The inside of each Plasma-sphere may contain a luminescent material such as a phosphor and/or a secondary electron emission material such as magnesium oxide or a rare earth oxide introduced during the gas filling of the microsphere.

12 Claims, 6 Drawing Sheets

U.S. PATENT DOCUMENTS

| | | | |
|---|---|---|---|
| 3,927,181 A | 12/1975 | Niimi et al. | |
| 3,935,494 A | 1/1976 | Dick et al. | |
| 3,939,822 A * | 2/1976 | Markowitz | 600/575 |
| 3,960,583 A | 6/1976 | Netting et al. | |
| 3,964,050 A | 6/1976 | Mayer | |
| 3,975,194 A | 8/1976 | Farnand et al. | |
| 3,998,618 A | 12/1976 | Kreik et al. | |
| 4,017,290 A | 4/1977 | Budrick et al. | |
| 4,021,253 A | 5/1977 | Budrick et al. | |
| 4,025,689 A | 5/1977 | Kobayashi et al. | |
| 4,035,690 A | 7/1977 | Roeber | |
| 4,075,025 A | 2/1978 | Rostoker | |
| 4,106,009 A | 8/1978 | Dick | |
| 4,119,422 A | 10/1978 | Rostoker | |
| 4,126,807 A | 11/1978 | Wedding et al. | |
| 4,126,809 A | 11/1978 | Wedding et al. | |
| 4,133,854 A | 1/1979 | Hendricks | |
| 4,162,282 A * | 7/1979 | Fulwyler et al. | 264/9 |
| 4,163,637 A | 8/1979 | Hendricks | |
| 4,164,678 A | 8/1979 | Biazzo et al. | |
| 4,166,147 A | 8/1979 | Lange et al. | |
| 4,211,738 A | 7/1980 | Genis | |
| 4,257,798 A | 3/1981 | Hendricks et al. | |
| 4,279,632 A | 7/1981 | Frosch et al. | |
| 4,290,847 A | 9/1981 | Johnson et al. | |
| 4,303,061 A | 12/1981 | Torobin | |
| 4,303,431 A | 12/1981 | Torobin | |
| 4,303,432 A | 12/1981 | Torobin | |
| 4,303,433 A | 12/1981 | Torobin | |
| 4,303,603 A | 12/1981 | Torobin | |
| 4,303,729 A | 12/1981 | Torobin | |
| 4,303,730 A | 12/1981 | Torobin | |
| 4,303,731 A | 12/1981 | Torobin | |
| 4,303,732 A | 12/1981 | Torobin | |
| 4,303,736 A | 12/1981 | Torobin | |
| 4,307,051 A | 12/1981 | Sargeant et al. | |
| 4,314,827 A | 2/1982 | Leitheiser et al. | |
| 4,322,378 A | 3/1982 | Hendricks | |
| 4,340,642 A | 7/1982 | Netting et al. | |
| 4,344,787 A * | 8/1982 | Beggs et al. | 65/21.4 |
| 4,349,456 A | 9/1982 | Sowman | |
| 4,363,646 A | 12/1982 | Torobin | |
| 4,366,112 A | 12/1982 | Turnbull et al. | |
| 4,391,646 A | 7/1983 | Howell | |
| 4,392,988 A | 7/1983 | Dobson et al. | |
| 4,411,847 A | 10/1983 | Netting et al. | |
| 4,415,512 A | 11/1983 | Torobin | |
| 4,459,145 A | 7/1984 | Elsholz | |
| 4,494,038 A | 1/1985 | Wedding et al. | |
| 4,525,314 A | 6/1985 | Torobin | |
| 4,542,066 A | 9/1985 | Delzant | |
| 4,547,233 A | 10/1985 | Delzant | |
| 4,548,196 A | 10/1985 | Torobin | |
| 4,548,767 A | 10/1985 | Hendricks | |
| 4,568,389 A | 2/1986 | Torobin | |
| 4,569,821 A | 2/1986 | Duperray et al. | |
| 4,582,534 A | 4/1986 | Torobin | |
| 4,596,681 A | 6/1986 | Grossman et al. | |
| 4,618,525 A | 10/1986 | Chamberlain et al. | |
| 4,637,990 A | 1/1987 | Torobin | |
| 4,638,218 A | 1/1987 | Shinoda et al. | |
| 4,671,909 A | 6/1987 | Torobin | |
| 4,713,300 A | 12/1987 | Sowman et al. | |
| 4,737,687 A | 4/1988 | Shinoda et al. | |
| 4,743,511 A | 5/1988 | Sowman et al. | |
| 4,743,545 A | 5/1988 | Torobin | |
| 4,757,036 A | 7/1988 | Kaar et al. | |
| 4,775,598 A | 10/1988 | Jaeckel | |
| 4,777,154 A | 10/1988 | Torobin | |
| 4,778,502 A | 10/1988 | Garnier et al. | |
| 4,782,097 A | 11/1988 | Jain et al. | |
| 4,793,980 A | 12/1988 | Torobin | |
| 4,797,378 A | 1/1989 | Sowman | |
| 4,800,180 A | 1/1989 | McAllister et al. | |
| 4,859,711 A | 8/1989 | Jain et al. | |
| 4,865,875 A | 9/1989 | Kellerman | |
| 4,879,321 A | 11/1989 | Laroche | |
| 4,883,779 A | 11/1989 | McAllister et al. | |
| 4,917,857 A | 4/1990 | Jaeckel et al. | |
| 4,960,351 A * | 10/1990 | Kendall et al. | 425/6 |
| 4,963,792 A | 10/1990 | Parker | |
| 5,017,316 A | 5/1991 | Sowman | |
| 5,053,436 A | 10/1991 | Delgado | |
| 5,055,240 A | 10/1991 | Lee et al. | |
| 5,069,702 A | 12/1991 | Block et al. | |
| 5,077,241 A | 12/1991 | Moh et al. | |
| 5,176,732 A | 1/1993 | Block et al. | |
| 5,185,299 A | 2/1993 | Wood et al. | |
| 5,212,143 A | 5/1993 | Torobin | |
| 5,225,123 A | 7/1993 | Torobin | |
| 5,257,657 A | 11/1993 | Gore | |
| 5,260,002 A * | 11/1993 | Wang | 264/4.1 |
| 5,326,298 A | 7/1994 | Hotomi | |
| 5,397,759 A | 3/1995 | Torobin | |
| 5,487,390 A | 1/1996 | Cohen et al. | |
| 5,500,287 A | 3/1996 | Henderson | |
| 5,520,715 A | 5/1996 | Oeftering | |
| 5,534,348 A | 7/1996 | Miller et al. | |
| 5,555,176 A | 9/1996 | Menhennett et al. | |
| 5,598,200 A | 1/1997 | Gore | |
| 5,749,408 A | 5/1998 | Gore | |
| 5,793,158 A | 8/1998 | Wedding | |
| 5,831,643 A | 11/1998 | Chung | |
| 6,149,072 A * | 11/2000 | Tseng | 239/87 |
| 6,176,584 B1 | 1/2001 | Best et al. | |
| 6,216,765 B1 | 4/2001 | Tseng et al. | |
| 6,273,552 B1 | 8/2001 | Hawkins et al. | |
| 6,309,711 B1 | 10/2001 | Tseng et al. | |
| 6,368,708 B1 | 4/2002 | Brown et al. | |
| 6,377,387 B1 * | 4/2002 | Duthaler et al. | 359/296 |
| 6,428,140 B1 * | 8/2002 | Cruz-Uribe | 347/20 |
| 6,432,330 B1 * | 8/2002 | Hanabe et al. | 264/9 |
| 6,439,689 B1 | 8/2002 | Silverbrook | |
| 6,446,878 B1 | 9/2002 | Chandra et al. | |
| 6,545,422 B1 | 4/2003 | George et al. | |
| 6,570,335 B1 | 5/2003 | George et al. | |
| 6,612,889 B1 | 9/2003 | Green et al. | |
| 6,620,012 B1 | 9/2003 | Johnson et al. | |
| 6,646,388 B2 | 11/2003 | George et al. | |
| 6,712,453 B2 | 3/2004 | Silverbrook | |
| 6,762,566 B1 | 7/2004 | George et al. | |
| 6,764,367 B2 | 7/2004 | Green et al. | |
| 6,791,264 B2 | 9/2004 | Green et al. | |
| 6,796,867 B2 | 9/2004 | George et al. | |
| 6,801,001 B2 | 10/2004 | Drobot et al. | |
| 6,802,189 B2 * | 10/2004 | Langsdorf et al. | 65/21.2 |
| 6,822,626 B2 | 11/2004 | George et al. | |
| 6,851,587 B1 | 2/2005 | Tseng | |
| 6,864,631 B1 | 3/2005 | Wedding | |
| 6,902,456 B2 | 6/2005 | George et al. | |
| 6,913,346 B2 | 7/2005 | Silverbrook | |
| 6,935,913 B2 | 8/2005 | Wyeth et al. | |
| 6,975,068 B2 | 12/2005 | Green et al. | |
| 7,005,793 B2 | 2/2006 | George et al. | |
| 7,021,745 B2 | 4/2006 | Silverbrook | |
| 7,025,648 B2 | 4/2006 | Green et al. | |
| 7,090,337 B2 | 8/2006 | Silverbrook | |
| 7,122,961 B1 | 10/2006 | Wedding | |
| 7,125,305 B2 | 10/2006 | Green et al. | |
| 7,129,166 B2 | 10/2006 | Speakman | |
| 7,137,857 B2 | 11/2006 | George et al. | |
| 7,140,941 B2 | 11/2006 | Green et al. | |
| 7,157,854 B1 | 1/2007 | Wedding | |
| 7,176,628 B1 | 2/2007 | Wedding | |

| | | |
|---|---|---|
| 7,247,989 B1 | 7/2007 | Wedding |
| 7,261,542 B2 | 8/2007 | Hickerson et al. |
| 7,288,014 B1 | 10/2007 | George et al. |
| 7,323,634 B2 | 1/2008 | Speakman |
| 2002/0004111 A1 | 1/2002 | Matsubara et al. |
| 2002/0005939 A1* | 1/2002 | Cuijpers et al. ............... 355/53 |
| 2002/0106501 A1* | 8/2002 | Debe ....................... 428/305.5 |
| 2003/0193268 A1* | 10/2003 | Junhua ....................... 310/328 |
| 2004/0063373 A1 | 4/2004 | Johnson et al. |
| 2004/0081689 A1* | 4/2004 | Dunfield et al. ............. 424/451 |
| 2004/0134311 A1* | 7/2004 | Bruske ........................ 75/335 |
| 2004/0149943 A1* | 8/2004 | Field ............................ 251/11 |
| 2004/0154435 A1* | 8/2004 | Kempf et al. ................. 75/335 |
| 2004/0175854 A1* | 9/2004 | George et al. ................. 438/30 |
| 2005/0022905 A1* | 2/2005 | Wong et al. ................ 148/33.3 |
| 2005/0095944 A1* | 5/2005 | George et al. ................... 445/3 |
| 2005/0161844 A1* | 7/2005 | Dunfield et al. ............. 264/4.1 |
| 2006/0097620 A1 | 5/2006 | George et al. |
| 2006/0202309 A1* | 9/2006 | Wong et al. ................. 257/618 |
| 2007/0015292 A1* | 1/2007 | Ruddick et al. ............. 436/524 |
| 2007/0015431 A1 | 1/2007 | Green et al. |

\* cited by examiner (US Patent 4,303,730)

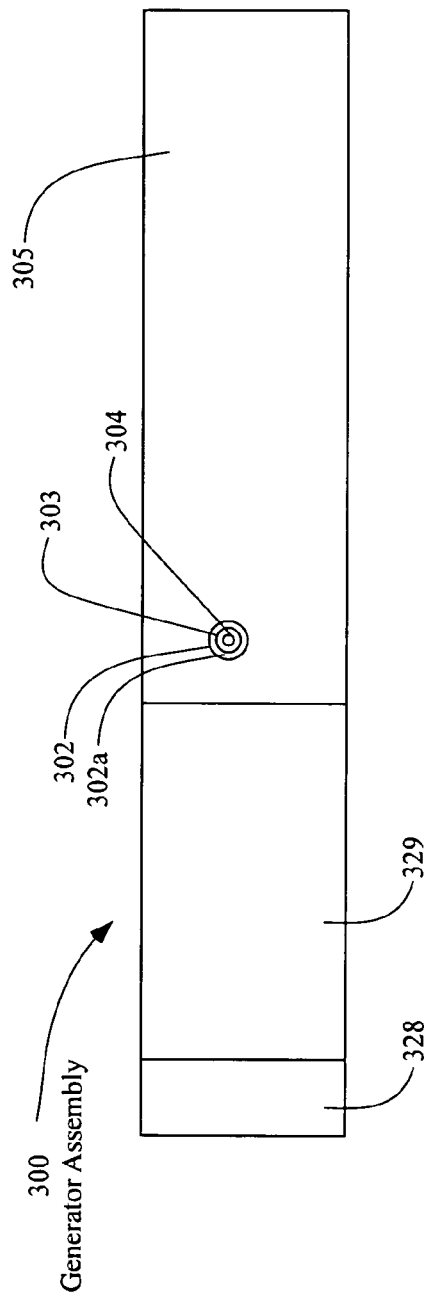
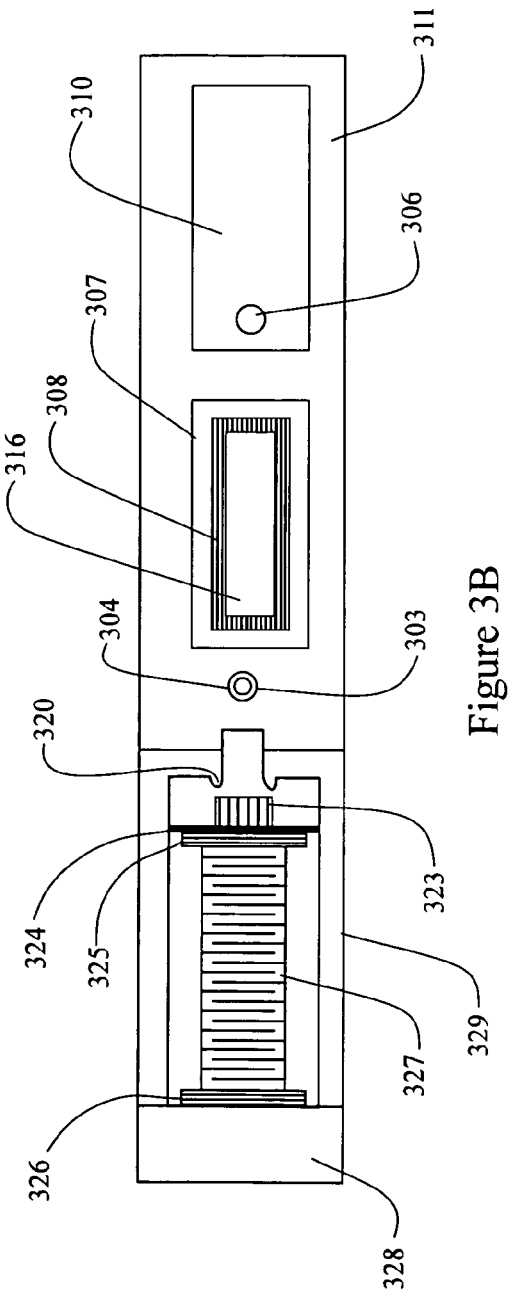
Figure 3A
Bottom View
Figure 3B
Section A-A View

Enlarged Area from Figure 3C

Enlarged Area from Figure 3C

Section B-B View

APPARATUS TO PREPARE DISCRETE HOLLOW MICROSPHERE DROPLETS

RELATED APPLICATION

Priority is claimed under 35 U.S.C 119(e) for Provisional Patent Application 60/698,955 filed Jul. 14, 2005.

INTRODUCTION

This invention relates to a method and apparatus to eject on demand discrete hollow microsphere droplets that are characterized by a highly regular and predictable spherical shape and devoid of tails, or other irregularities common in the prior art with a selected pure gas contained in the center. With this method and apparatus, droplets may be formed of any suitable material including plastic, glass, ceramic, or metal. A variety of gases at various pressures including complete vacuums may be contained in the center. Low temperature and high temperature method and apparatus are disclosed. The hollow microsphere may be used as pixels in a plasma display panel (PDP). When used as pixels in a PDP the microspheres may be called Plasma-spheres. The incorporation of gas filled microspheres in a PDP is disclosed in U.S. Pat. No. 6,864,631 (Wedding), incorporated herein by reference.

BACKGROUND

Uses of Hollow Microspheres

Hollow microspheres ranging in size from 10 microns (μm) to 2000 microns (μm) have various applications. As used herein 25.4 microns equal one mil (0.001 inch). Microspheres are used in filler for paint and auto bodies, chemical containment and clean up, medicine delivery systems, laser targets, solar panels, and flat panel displays. Various applications have various requirements. Some applications require ultra pure fill gas in the hollow sphere. Some applications require uniformity of size, shape, and shell thickness.

Methods or processes to produce hollow spheres or microspheres are known in the prior art. Microspheres may be formed from glass, ceramic, metal, plastic, and other materials. Various methods have been disclosed and practiced in the prior art, including methods that produce hollow microspheres containing a gas. Several methods are discussed below.

Cold Coaxial Extrusion Method

U.S. Pat. No. 4,349,456 (Sowman), discloses a cold coaxial extrusion process for making ceramic metal oxide microspheres by blowing a slurry of ceramic and highly volatile organic fluid through a coaxial nozzle. As the liquid dehydrates, gelled microcapsules are formed. These microcapsules are dried and fired to convert them into microspheres. During the firing process, the microcapsules may be fired in a select gas atmosphere under controlled pressure. As the microcapsule sinters to an impervious state, the gas is trapped within the hollow center.

Hollow spheres formed using this method tend to taper and have tails (like comets). Additionally, the inner wall generally has an internal seam (like a walnut). Shell material is limited to materials that sinter well. Additionally, some shell material will deform and cause sticking between individual spheres during firing.

Impermeation of Gas Method

Hollow glass microspheres may be produced by impermeating a gas into a glass frit. The frit is passed through a heat chamber and the gas expands, forming the frit into spheres. Microspheres formed by this method have diameters ranging from about 5 microns (μm) to approximately 5,000 microns (μm). This method produces spheres with a residual blowing gas enclosed in the sphere. The blowing gases typically include $SO_2$, $CO_2$, and $H_2O$. These residual gases may be undesirable in certain applications requiring pure gas fill.

Hollow microspheres may also be formed as disclosed in U.S. Pat. Nos. 5,500,287 (Henderson), and 5,501,871 (Henderson). In Henderson ('287), the hollow microspheres are formed by dissolving a permeant gas (or gases) into glass frit particles. The gas permeated frit particles are then heated at a high temperature sufficient to blow the frit particles into hollow microspheres containing the permeant gases. The gases may be subsequently out-permeated and evacuated from the hollow sphere as described in step D in column 3 of Henderson ('287). Henderson ('287) and ('871) are limited to gases of small molecular size. Some gases such as xenon, argon, and krypton may be too large to be permeated through the frit material or wall of the microsphere. Helium which has a small molecular size may leak through the microsphere wall or shell.

Hot Coaxial Extrusion Method

U.S. Pat. No. 4,415,512 (Torobin) discloses a hot coaxial extrusion method for forming hollow glass spheres. This method comprises forming a film of molten glass across a blowing nozzle and applying a blowing gas at a positive pressure on the inner surface of the film to blow the film and form an elongated cylinder shaped liquid film of molten glass. An inert entraining fluid is directed over and around the blowing nozzle at an angle to the axis of the blowing nozzle so that the entraining fluid dynamically induces a pulsating or fluctuating pressure at the opposite side of the blowing nozzle in the wake of the blowing nozzle. The continued movement of the entraining fluid produces asymmetric fluid drag forces on a molten glass cylinder, which close and detach the elongated cylinder from the coaxial blowing nozzle. Surface tension forces acting on the detached cylinder form the latter into a spherical shape, which is rapidly cooled and solidified by cooling means to form a glass microsphere.

In one embodiment of the above method for producing the glass microspheres, the ambient pressure external to the blowing nozzle is maintained at a super atmospheric pressure. The ambient pressure external to the blowing nozzle is such that it substantially balances, but is slightly less than the blowing gas pressure. Such a method is disclosed by U.S. Pat. No. 4,303,432 (Torobin) and WO 8000438A1 (Torobin), both incorporated herein by reference.

The microspheres may also be produced using a centrifuge apparatus and method as disclosed by U.S. Pat. No. 4,303,433 (Torobin) and WO8000695A1 (Torobin), both incorporated herein by reference.

The hot coaxial method disclosed by Torobin and others may be used to produce ceramic, glass, metal, and plastic hollow microspheres. However, these spheres are typically irregularly shaped with comet tails and seams internal to the sphere.

Other methods for forming microspheres of glass, ceramic, metal, plastic, and other materials are disclosed in other Torobin patents including U.S. Pat. Nos. 5,397,759; 5,225,123; 5,212,143; 4,793,980; 4,777,154; 4,743,545; 4,671,909; 4,637,990; 4,582,534; 4,568,389; 4,548,196; 4,525,314; 4,363,646; 4,303,736; 4,303,732; 4,303,731; 4,303,730; 4,303,729; 4,303,603; 4,303,431; and 4,303,061, all incorporated herein by reference.

Additional references (jetting & valving) include U.S. Pat. Nos. 5,670,999; 6,024,340; 6,341,851; 6,412,926; and 6,447,106, all incorporated herein by reference.

BRIEF DESCRIPTION OF THE DRAWINGS

FIG. 3a is bottom view of the apparatus illustrating the jet nozzle and coaxial gas blow nozzle tube.

FIG. 3b is a horizontal section A-A of the apparatus identified in FIG. 3.

DETAILED DESCRIPTION AND EMBODIMENTS OF THE INVENTION

This invention discloses a method and apparatus to form regularly and uniformly shaped hollow spheres devoid of tails and seams, filled with a variety of gases and free from contamination. This method and apparatus is especially appropriate for small sizes including sizes below 500 microns, but may also be extended to larger sizes above 500 microns.

A variety of materials may be used to form the shell. In general, the low temperature method and apparatus described herein is especially appropriate for glass, ceramic, plastic, and metal. The high temperature method and apparatus is particularly appropriate for glass and plastic.

The invention is most related to the coaxial methods of Sowman and/or Torobin previously described. However, this invention is an improvement over the prior art because it employs jetting methods to deliver a controlled volume of shell material such as molten glass and a controlled volume of gas to form and fill the sphere.

Figure 1:
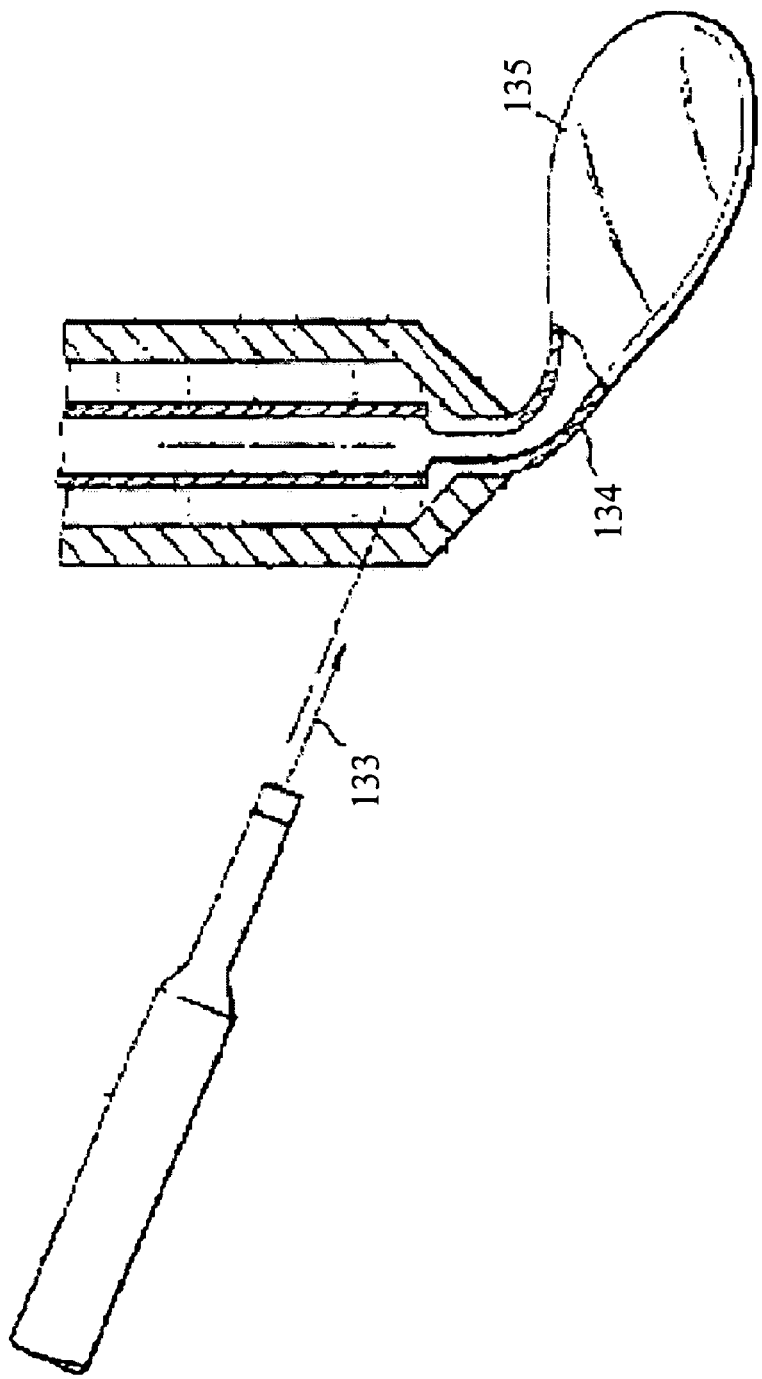
FIG. 1 is prior art and illustrates one embodiment of the Torobin hot coaxial-extrusion method disclosed in U.S. Pat. No. 4,303,730.

FIG. 1 is a prior art illustration of a coaxial extrusion device disclosed in U.S. Pat. No. 4,303,730 (Torobin). The Torobin ('730) device produces a continuous ribbon [134] of hollow molten material such as glass that must be broken into small segments approximately the diameter of the ribbon so as to form microspheres. To support the breakage of the ribbon into small microsphere size segments [135] Torobin ('730) uses a pulsating traverse jet of inert gas [133] directed against the liquid ribbon as it is formed. The transverse jet is used to agitate the molten ribbon and strip it from the nozzle. The spheres formed using this method are shown as 17a, 17b, and 17c in FIG. 3C of Torobin ('730). The spheres have tails 17d. Glass ribbon segments so formed have residual tail like artifacts that lower the production uniformity and decrease the yield of the microspheres produced.

Figure 2:
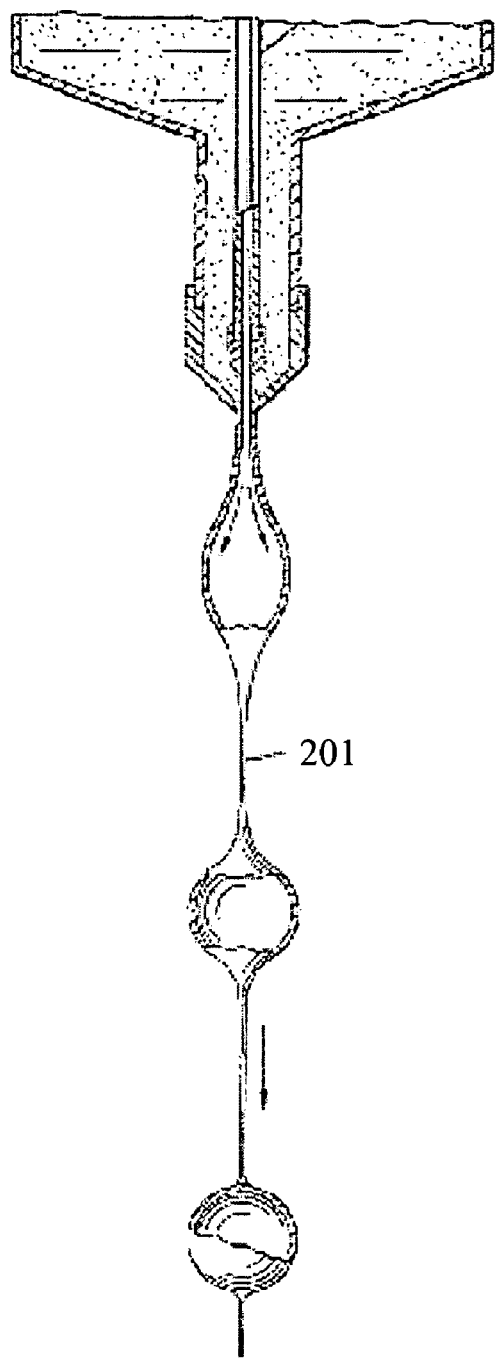
FIG. 2 is prior art and illustrates an alternate embodiment Torobin hot coaxial-extrusion method disclosed in U.S. Pat. No. 4,671,909.

FIG. 2 is a prior art embodiment of FIGS. 2 and 3A of U.S. Pat. No. 4,303,730 (Torobin) that does not use a transverse jet to strip the bubble. Spheres produced using this method also have a tail [201].

Figure 3:
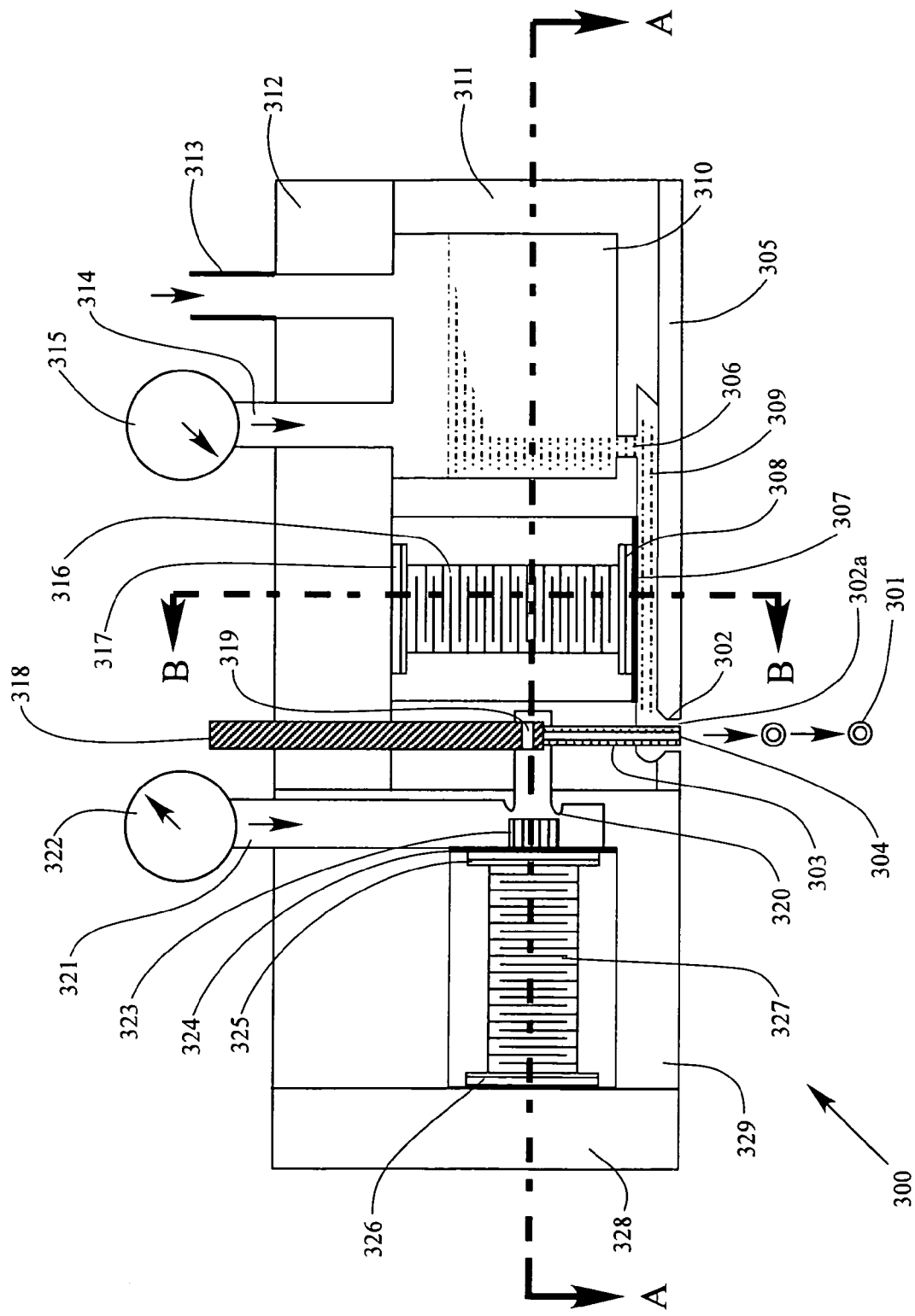
FIG. 3 is a front sectional view illustrating the internal structure of the sphere-on-demand jet apparatus and method of the present invention at for use at moderate temperatures.

FIG. 3 shows hollow microsphere generator assembly [300] arranged for producing microsphere [301] from jet nozzle [302]. The jet nozzle [302] also has a coaxial gas blow nozzle tube [303] that together with jet nozzle [302] forms an annulus [302a]. During each demand cycle a controlled volume of liquid material is ejected through annulus enveloping fill-gas orifice [304]. Simultaneously, a controlled volume of fill-gas is ejected through gas orifice [304] to form and fill the interior of the droplet as it is formed.

Both the controlled discrete volume of the liquid shell material and the controlled discrete volume of gas are metered out by a mechanical actuator such as a piezoelectric device. This is described in further detail below.

Consider first the liquid shell material. When an electrical impulse is applied to the piezoelectric device [316] with electrodes [308] and [317], it expands and acts to eject or jet the liquid shell material out of a chamber [309] through the annular orifice [304]. Mechanical and electrical isolation between the piezoelectric device [316] and the chamber [309] is maintained with a flexible member or optional diaphragm [307]. Liquid shell material contents in the chamber [309] is replenished from a main reservoir [310] through aperture [306]. The main reservoir [310] also has an optional port [313] for replenishing the liquid.

An optional gas over pressure port [314] control pressure in the main reservoir through pressure regulator [315]. Gas over pressure port [314] and pressure regulator [315] cooperate so as to maintain a minimal fluid overpressure when needed.

The volume of fill-gas is controlled by an electromechanical valve actuator such as a piezoelectric device [327], with electrodes [326] and [325], which synchronizes the fill-gas ejected with the liquid ejected. When energized, piezoelectric device [327] acts to control the flow of gas out of the pressurized chamber [321] through the action of valve member [323] supported by diaphragm or flexible member [324] contacting valve seat [320]. Momentarily opening valve [320] allows an impulse of fill-gas to flow through opening [319] into gas blow nozzle tube [303] out of gas orifice [304] to conjoin into the center of the liquid droplet as it is ejected from jet nozzle [302]. Further, the pressure and flow of gas in pressure chamber [321] is controlled with gas regulator [322] and replenished as needed and the adjustment of the physical position of jet nozzle [302] and gas blow nozzle tube [303] is controlled by adjustment member [318]. The entire generator [300] is contained within a housing comprised of main liquid housing [311], liquid housing top cover [312], liquid housing bottom cover [305], main gas housing [329] and gas housing cover [328].

FIG. 3a illustrates a bottom view of microsphere generator assembly [300]. Gas blow nozzle tube [303] with its orifice gas [304] is shown concentric within liquid jet nozzle [302] forming annulus [302a]. Other structural parts include main gas housing [329], gas cover [328] and liquid housing cover [305].

FIG. 3b is a horizontal section view A-A of FIG. 3. Main body [311] contains liquid reservoir [310] with aperture [306]. Piezoelectric actuator [316] is shown with bottom electrode [308], and diaphragm [307] gas orifice [304] and gas blow nozzle tube [303]. Piezoelectric gas valve actuator [327] is shown with its electrodes [326]/[325], gas valve member [323], diaphragm flexible member [324], cover [328], and gas valve seat [320].

Figure 3D:
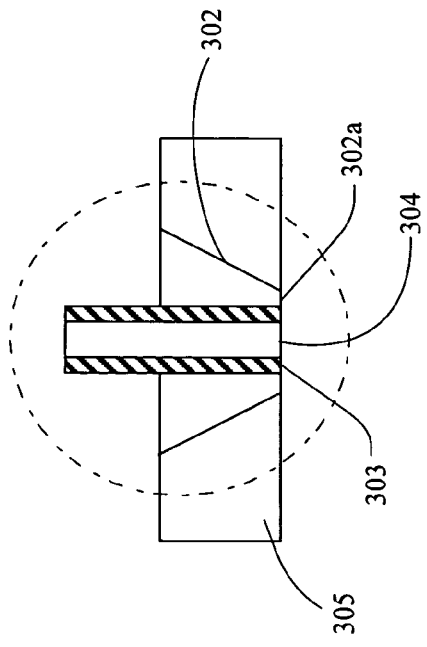
FIG. 3d is an enlarged view of a configuration of the gas blow nozzle tube configuration of FIG. 3.
Figure 3E:
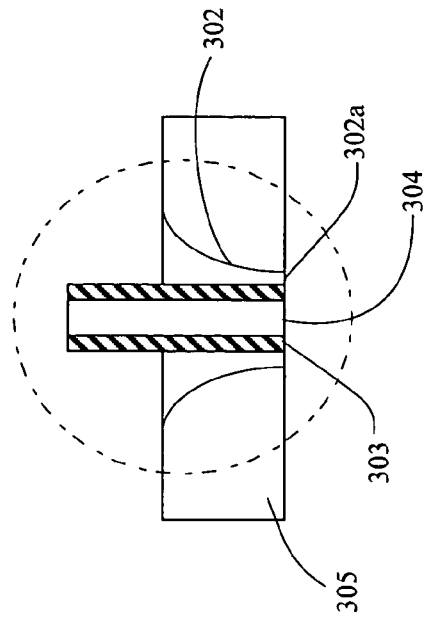
FIG. 3e is an enlarged view of an alternate configuration of the gas blow nozzle tube configuration of FIG. 3.
Figure 3C:
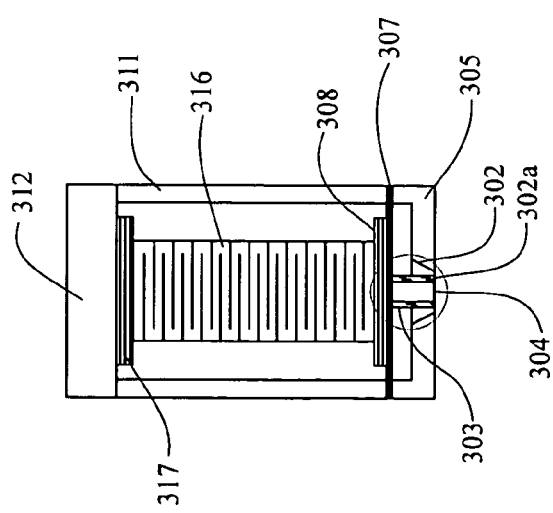
FIG. 3c is vertical section of the apparatus illustrated in FIG. 3.

FIG. 3c is a vertical section view B-B of FIG. 3. Main body [311] contains covers [312] and [305] and liquid piezoelectric actuator [316], with electrodes [317] & [308]. Liquid jet nozzle [302], gas blow nozzle tube [303], gas orifice [304], diaphragm flexible member [307], and liquid orifice [302a] are also shown.

FIG. 3d is an enlarged section view of a liquid jet nozzle [302] in lower cover plate [305] with concentric gas blow tube [303], liquid orifice [302a] and orifice [304].

FIG. 3e is an enlarged section view of the rounded jet nozzle [302] in lower cover plate [305] with concentric gas blow nozzle tube [303], liquid orifice [302a], and gas orifice [304].

Figure 4:
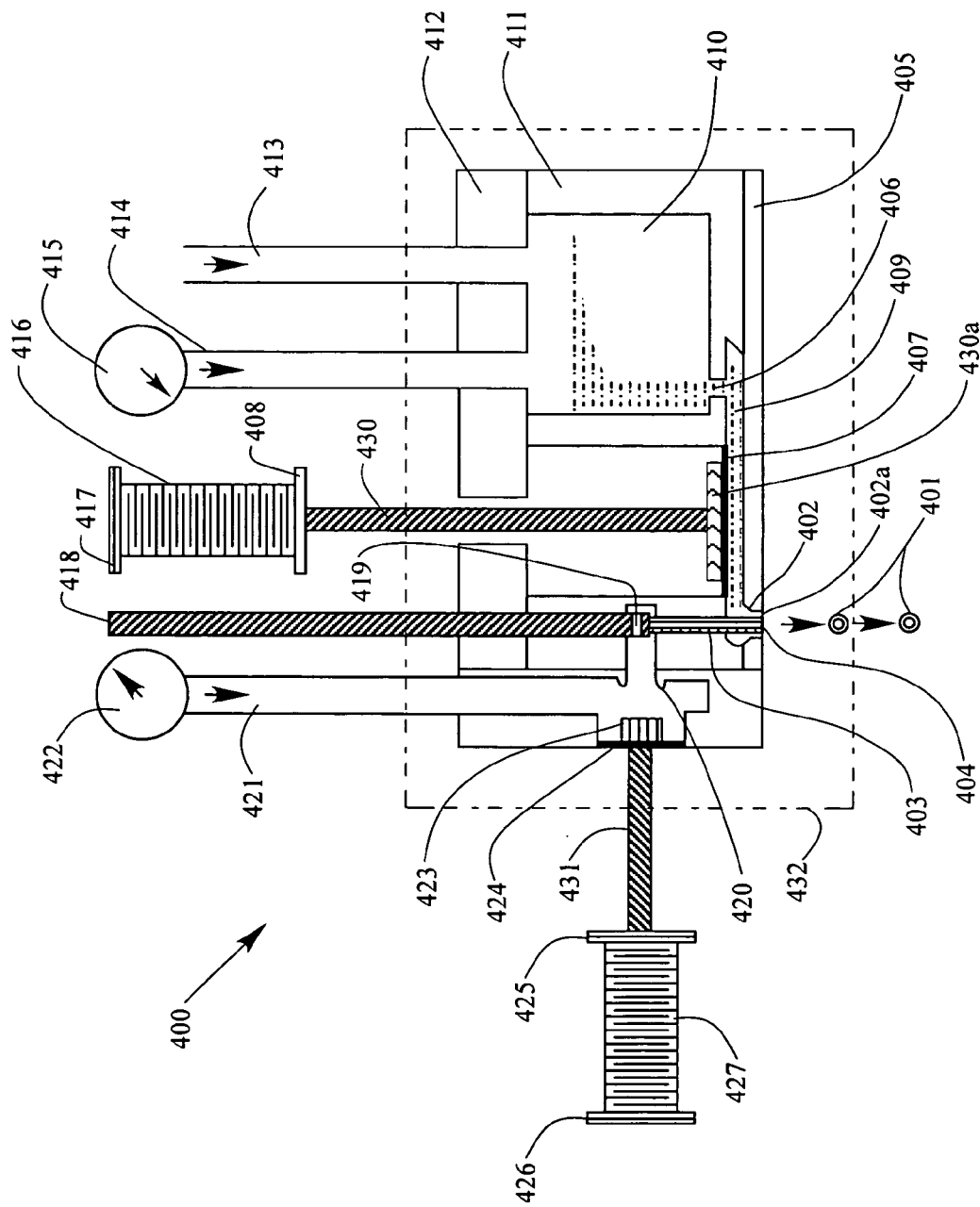
FIG. 4 is a front sectional view illustrating the internal structure of the sphere-on-demand jet method of the present invention for use at high temperatures.

FIG. 4 shows an alternative embodiment of producing microspheres, which is especially useful for high temperature liquids including glass. In this embodiment, temperature sensitive actuators such as piezoelectric actuators [427] and [416] are remote from the high temperature liquid and gas. They are separated from the high temperature system by insulator [432]. Impulse communication members [430],[418] and [431] transfer the impulse from the remote actuators [427] and [416] through the insulation to respective chambers.

Other than the remote actuators the systems functions similarly to the first embodiment detailed in FIGS. 3, 3a, 3b, 3c. The hollow microsphere generator assembly [400] produces glass microsphere [401] from jet nozzle [402]. The orifice [402] also has a coaxial gas blow nozzle tube [403] that together with jet nozzle [402] forms an annulus. During each demand cycle a controlled volume of liquid glass material is ejected through annulus enveloping fill-gas orifice [404]. Simultaneously, a controlled volume of fill-gas is ejected through gas orifice [404] to form and fill the interior of the glass droplet as it is formed.

Both the controlled discrete volume of the liquid shell material and the controlled discrete volume of gas are controlled by a mechanical actuator such as a piezoelectric device. This is described in further detail below.

Consider first the liquid shell material. When an electrical impulse is applied to the piezoelectric device [416] by electrodes [408] and [417], it expands and causes a momentary force, transferred through member [430, 430a] to eject or jet the molten or liquid glass shell material out of a chamber [409] through the orifice [402a]. Mechanical and electrical isolation between the member [430, 430a] and the chamber [409] is maintained with a flexible member or diaphragm [407]. Liquid shell material contents in the chamber [409] is replenished from a main reservoir [410] through aperture [406]. The main reservoir [410] also has an optional port [413] for replenishing the liquid.

An optional gas pressure port [414] control pressure in the main reservoir through pressure regulator [415]. Gas pressure port [414] and pressure regulator [415] cooperate so as to maintain a minimal fluid pressure when needed.

The volume of fill-gas is controlled by an electromechanical valve actuator such as a piezoelectric device which synchronizes the fill-gas ejected with the liquid ejected. When energized by electrodes [425] and [426], piezoelectric device [427] transfers an impulse through member [431] and acts to control the flow of gas out of the pressurized chamber [421] through the action of member 423 supported by diaphragm [424] contracting valve seat [420]. Momentarily opening valve member [423] allows an impulse of fill-gas to flow through opening [419] into hollow tube [406] and out of orifice [404] to conjoin into the center of the liquid droplet as it is ejected from orifice [402a]. Further, the pressure and flow of gas in chamber [421] is controlled with gas regulator [422] and replenished as needed. Main housing [411], top cover [412], and bottom cover [405] contain the liquid.

Although this design illustrated in FIG. 3 and FIG. 4 were illustrated in its most simple form, with a single piezoelectric device, used for gas and a single piezoelectric device used for liquid, other configurations employing multiple piezoelectric devices are possible and contemplated. For example, one piezoelectric device can act to block liquid from entering the outer annulus until the controlled volume chamber is filled, while another piezoelectric device acts to plunge or jet the liquid after the chamber is filled. Two piezoelectric devices can be applied to the gas control.

Alternate embodiments envisioned include other forms of electromagnetic actuators instead of the piezo including voice-coil types or a heat-generating resistor. When a pulse-like voltage is applied to the heat-generating resistor, the heat-generating resistor generates heat, thereby bringing the liquid material in the flowpath to a boil to generate vapor bubbles. Droplets of the material are emitted from a nozzle by the pressure of the generated vapor bubbles.

Additionally, the size shape and relative configuration of chambers [309], [310], [321], and [319] in FIG. 3 and [409], [410], [421], and [419] of FIG. 4 are illustrative only, and may be changed or reshaped depending on the specific application. Specifically, the pressure chamber may be configured in a number of different arrangements that promote ejection of liquid droplets.

The apparatus and method of this invention as disclosed in FIG. 3 and FIG. 4 may be used to produce hollow glass microspheres or Plasma-spheres useful as the pixel element of a plasma display. The gas filled microspheres may be incorporated into a plasma display panel (PDP) for example as disclosed in U.S. Pat. No. 6,864,631 (Wedding), incorporated herein by reference.

Microspheres or Plasma-spheres are characterized by a shell formed of light transmissive material such as glass and filled with an ionizable gas. In the excited or ionized state, the gas may produce visible or ultraviolet light or a combination of both. Ultraviolet light may be used to excite a phosphor to produce visible light such as red, blue, and green. Visible light produced from the ionizable gas may be viewed directly or it may also be used in combination with a phosphor to increase efficiency or alter the color produced.

Ionizable Gas

The gas used to fill the microspheres or Plasma-spheres may be of any composition or mixture suitable for the intended use or application of the microsphere. If the microspheres are to be used in a plasma display device, the spheres are filled with an ionizable gas.

As used herein, ionizable gas or gas means one or more gas components. In the practice of this invention, the gas is typically selected from a mixture of the noble or rare gases of neon, argon, xenon, krypton, helium, and/or radon. The rare gas may be a Penning gas mixture. Other contemplated gases include nitrogen, $CO_2$, CO, mercury, halogens, excimers, oxygen, hydrogen, and mixtures thereof.

Isotopes of the above and other gases are contemplated. These include isotopes of helium such as helium 3, isotopes of hydrogen such as deuterium (heavy hydrogen), tritium ($T^3$) and DT, isotopes of the rare gases such as xenon-129, isotopes of oxygen such as oxygen-18. Other isotopes include deuterated gases such as deuterated ammonia ($ND_3$) and deuterated silane ($SiD_4$).

In one embodiment, a two-component gas mixture (or composition) is used such as a mixture of argon and xenon, argon and helium, xenon and helium, neon and argon, neon and xenon, neon and helium, and neon and krypton.

Specific two-component gas mixtures (compositions) include about 5% to 90% atoms of argon with the balance xenon.

Another two-component gas mixture is a mother gas of neon containing 0.05% to 15% atoms of xenon, argon, or krypton. The mixture can also be a three-component gas, four-component gas, or five-component gas by using small quantities of an additional gas or gases selected from xenon, argon, krypton, and/or helium.

In another embodiment, a three-component ionizable gas mixture is used such as a mixture of argon, xenon, and neon wherein the mixture contains at least 5% to 80% atoms of argon, up to 15% xenon, and the balance neon. The xenon is present in a minimum amount sufficient to maintain the Penning effect. Such a mixture is disclosed in U.S. Pat. No. 4,926,095 (Shinoda et al.), incorporated herein by reference. Other three-component gas mixtures include argon-helium-xenon; krypton-neon-xenon; and krypton-helium-xenon.

U.S. Pat. No. 4,081,712 (Bode et al.), incorporated by reference, discloses the addition of helium to a gaseous medium of 90% to 99.99% atoms of neon and 10% to 0.01% atoms of argon, xenon, and/or krypton.

In one embodiment there is used a high concentration of helium with the balance selected from one or more gases of neon, argon, xenon, and nitrogen as disclosed in U.S. Pat. No. 6,285,129 (Park), incorporated herein by reference.

A high concentration of xenon may also be used with one or more other gases as disclosed in U.S. Pat. No. 5,770,921 (Aoki et al.), incorporated herein by reference.

Pure neon may be used and the microspheres or Plasma-spheres operated without memory margin using the architecture disclosed by U.S. Pat. No. 3,958,151 (Yano) discussed above and incorporated by reference.

Excimers

Excimer gases may also be used as disclosed in U.S. Pat. Nos. 4,549,109 (Nighan et al.) and 4,703,229 (Nighan et al.), both incorporated herein by reference. Nighan et al. ('109) and ('229) disclose the use of excimer gases formed by the combination of halogens with rare gases. The halogens include fluorine, chlorine, bromine and iodine. The rare gases include helium, xenon, argon, neon, krypton and radon. Excimer gases may emit red, blue, green, or other color light in the visible range or light in the invisible range. The excimer gases may be used alone or in combination with phosphors. U.S. Pat. No. 6,628,088 (Kim et al.), incorporated herein by reference, also discloses excimer gases for a PDP.

Other Gases

Depending upon the application, a wide variety of gases is contemplated for the practice of this invention. Such other applications include gas-sensing devices for detecting radiation and radar transmissions. Such other gases include $C_2H_2$—$CF_4$—Ar mixtures as disclosed in U.S. Pat. Nos. 4,201,692 (Christophorou et al.) and 4,309,307 (Christophorou et al.), both incorporated herein by reference. Also contemplated are gases disclosed in U.S. Pat. No. 4,553,062 (Ballon et al.), incorporated by reference. Other gases include sulfur hexafluoride, HF, $H_2S$, $SO_2$, SO, $H_2O_2$, and so forth.

Gas Pressure

The microspheres may be filled with gas at any suitable pressure. This invention allows the construction and operation of a gas discharge (plasma) display with microspheres or Plasma-spheres at gas pressures at or above 1 atmosphere. In the prior art, gas discharge (plasma) displays are operated with the ionizable gas at a pressure below atmospheric. Gas pressures above atmospheric have not been used in the prior art because of structural problems. Higher gas pressures above atmospheric may cause the plasma panel substrates to separate, especially at elevations of 4000 feet or more above sea level. Such separation may also occur between the substrate and a viewing envelope or dome in a single substrate or monolithic plasma panel structure.

In one embodiment of this invention, the gas pressure inside of each microsphere or Plasma-sphere is equal to or less than atmospheric, about 150 to 760 Torr, typically about 350 to about 650 Ton.

In another embodiment of this invention, the gas pressure inside of each microsphere or Plasma-sphere is equal to or greater than atmospheric. Depending upon the structural strength of the microsphere or Plasma-sphere, the pressure above atmospheric may be about 1 to 250 atmospheres (760 to 190,000 Ton) or greater. Higher gas pressures increase the luminous efficiency of the plasma display.

Gas Processing of a Plasma Display

This invention avoids the costly prior art gas filling techniques used in the manufacture of gas discharge (plasma) display devices. The prior art introduces gas through one or more apertures into the device requiring a gas injection hole and tube. The prior art manufacture steps typically include heating and baking out the assembled device (before gas fill) at a high-elevated temperature under vacuum for 2 to 12 hours. The vacuum is obtained via external suction through a tube inserted in an aperture.

The bake out is followed by back fill of the entire panel with an ionizable gas introduced through the tube and aperture. The tube is then sealed-off.

This bake out and gas fill process is a major production bottleneck and yield loss in the manufacture of gas discharge (plasma) display devices, requiring substantial capital equipment and a large amount of process time. For color AC plasma display panels of 40 to 50 inches in diameter, the bake out and vacuum cycle may be 10 to 30 hours per panel or 10 to 30 million hours per year for a manufacture facility producing over 1 million plasma display panels per year. The gas-filled Plasma-spheres used in this invention can be produced in large economical volumes and added to the gas discharge (plasma) display device without the necessity of costly bake out and gas process capital equipment. The savings in capital equipment cost and operations costs are substantial. Also the entire PDP does not have to be gas processed with potential yield loss at the end of the PDP manufacture.

Secondary Electron Emission

For secondary electron emission, the Plasma-sphere may contain one or more materials such as magnesium oxide having a sufficient Townsend coefficient. These include inorganic compounds of magnesium, calcium, strontium, barium, gallium, lead, aluminum, boron, and the rare earths especially lanthanum, cerium, actinium, and thorium. The contemplated inorganic compounds include oxides, carbides, nitrides, nitrates, silicates, aluminates, phosphates, borates and other inorganic compounds of the above and other elements.

The use of secondary electron emission (Townsend coefficient) materials in a plasma display is disclosed in U.S. Pat. No. 3,716,742 (Nakayama et al.). The use of Group IIA compounds including magnesium oxide is disclosed in U.S. Pat. Nos. 3,836,393 and 3,846,171. The use of rare earth compounds in an AC plasma display is disclosed in U.S. Pat. Nos. 4,126,807 (Wedding et al.), 4,126,809 (Wedding et al.), and 4,494,038, (Wedding et al.), incorporated herein by reference. Lead oxide may also be used as a secondary electron material. Mixtures of secondary electron emission materials may be used.

In one embodiment and mode contemplated for the practice of this invention, the secondary electron emission material is magnesium oxide on part or all of the internal surface of a Plasma-sphere. The secondary electron emission material may also be on the external surface. The thickness of the magnesium oxide may range from about 250 Angstrom Units to about 10,000 Angstrom Units (Å).

Secondary electron material may be incorporated or added to the Plasma-sphere during gas fill. The secondary electron material may be dispersed or suspended as particles within the ionizable gas such as with a fluidized bed. Phosphor particles may also be dispersed or suspended in the gas such as with a fluidized bed, and also added to the inner or external surface of the Plasma-sphere.

Magnesium oxide increases the ionization level through secondary electron emission that in turn leads to reduced gas discharge voltages. In one embodiment, the magnesium oxide is on the inner surface of the Plasma-sphere and the phosphor is located on external surface of the Plasma-sphere. However, phosphor may be added to the gas fill stream and located inside the Plasma-sphere.

Magnesium oxide is susceptible to contamination. To avoid contamination, gas discharge (plasma) displays are assembled in clean rooms that are expensive to construct and maintain. In traditional plasma panel production, magnesium oxide is applied to an entire open substrate surface and is vulnerable to contamination. The adding of the magnesium oxide layer to the inside of a Plasma-sphere minimizes exposure of the magnesium oxide to contamination.

PDP Structure

Different plasma display panels (PDP) structures are contemplated. The practice of this invention includes the use of Plasma-spheres with monochrome (single color) AC plasma displays and multi-color (two or more colors) AC plasma displays. Also monochrome and multicolor DC plasma displays are contemplated.

Examples of monochrome AC gas discharge (plasma) displays are well known in the prior art and include those disclosed in U.S. Pat. Nos. 3,559,190 (Bitzer et al.), 3,499,167 (Baker et al.), 3,860,846 (Mayer), 3,964,050 (Mayer), 4,080,597 (Mayer), 3,646,384 (Lay), and 4,126,807 (Wedding), all incorporated herein by reference.

Examples of multicolor AC plasma displays are well known in the prior art and include those disclosed in U.S. Pat. Nos. 4,233,623 (Pavliscak), 4,320,418 (Pavliscak), 4,827,186 (Knauer, et al.), 5,661,500 (Shinoda et al.), 5,674,553 (Shinoda, et al.), 5,107,182 (Sano et al.), 5,182,489 (Sano), 5,075,597 (Salavin et al.), 5,742,122 (Amemiya et al.), 5,640,068 (Amemiya et al.), 5,736,815 (Amemiya), 5,541,479 (Nagakubi), 5,745,086 (Weber), and 5,793,158 (Wedding), all incorporated herein by reference.

This invention may be practiced in a DC gas discharge (plasma) display which is well known in the prior art, for example as disclosed in U.S. Pat. Nos. 3,886,390 (Maloney et al.), 3,886,404 (Kurahashi et al.), 4,035,689 (Ogle et al.) and 4,532,505 (Holz et al.), all incorporated herein by reference.

In one embodiment, the Plasma-spheres are located on or in a single substrate or monolithic PDP structure. Single substrate PDP structures are disclosed in U.S. Pat. Nos. 3,646,384 (Lay), 3,652,891 (Janning), 3,666,981 (Lay), 3,811,061 (Nakayama et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda), all cited above and incorporated herein by reference. The Plasma-spheres may be positioned on the surface of the substrate and/or positioned in substrate openings such as in channels, trenches, grooves, holes, wells, cavities, hollows, and so forth. These channels, trenches, grooves, holes, wells, cavities, hollows, etc., may extend through the substrate so that the Plasma-spheres positioned therein may be viewed from either side of the substrate.

The Plasma-spheres may also be positioned on or in a substrate within a dual substrate plasma display structure. Each Plasma-sphere is placed inside of a gas discharge (plasma) display device, for example, on the substrate along the channels, trenches, grooves, etc. between the barrier walls of a plasma display barrier structure such as disclosed in U.S. Pat. Nos. 5,661,500 (Shinoda et al.) and 5,674,553 (Shinoda et al.) and 5,793,158 (Wedding), cited above and incorporated herein by reference. The Plasma-spheres may also be positioned within a cavity, well, hollow, concavity, or saddle of a plasma display substrate, for example as disclosed by U.S. Pat. No. 4,827,186 (Knauer et al.), incorporated herein by reference.

In a device as disclosed by Wedding ('158) or Shinoda et al. ('500), the Plasma-spheres may be conveniently added to the substrate cavities and the space between opposing electrodes before the device is sealed. An aperture and tube can be used for bake out if needed of the space between the two opposing substrates, but the costly gas fill operation is eliminated.

In one embodiment, the Plasma-spheres are conveniently added to the gas discharge space between opposing electrodes before the device is sealed. The presence of the Plasma-spheres inside of the display device add structural support and integrity to the device. The present color AC plasma displays of 40 to 50 inches are fragile and are subject to breakage during shipment and handling.

The Plasma-spheres may be sprayed, stamped, pressed, poured, screen-printed, or otherwise applied to the substrate. The substrate surface may contain an adhesive or sticky surface to bind the Plasma-sphere to the substrate.

The practice of this invention is not limited to a flat surface display. The Plasma-sphere may be positioned or located on a conformal surface or substrate so as to conform to a predetermined shape such as a curved or irregular surface.

In one embodiment of this invention, each Plasma-sphere is positioned within a hole, well, cavity, etc. on a single-substrate or monolithic gas discharge structure that has a flexible or bendable substrate. In another embodiment, the substrate is rigid. The substrate may also be partially or semi-flexible.

Positioning of a Plasma-Sphere on a PDP Substrate

The Plasma-sphere may be positioned or located on a PDP substrate by any appropriate means. In one embodiment of this invention, the Plasma-sphere is bonded to the surface of a monolithic or dual-substrate display such as a PDP. The Plasma-sphere is bonded to the substrate surface with a non-conductive, adhesive material which may also serve as an insulating barrier to prevent electrically shorting of the conductors or electrodes connected to the Plasma-sphere.

The Plasma-sphere may be mounted or positioned within a substrate opening such as a hole, well, cavity, hollow, or like depression. The hole, well, cavity, hollow, or depression is of suitable dimensions with a mean or average diameter and depth for receiving and retaining the Plasma-sphere. As used herein hole includes well, cavity, hollow, depression, or any similar configuration that accepts the Plasma-sphere. In Knauer et al. ('186), there is shown a cavity referred to as a concavity or saddle. The depression, well or cavity may extend partly through the substrate, embedded within or extend entirely through the substrate. The cavity may comprise an elongated channel, trench, or groove extending partially or completely across the substrate.

Light Barriers

Light barriers of opaque, translucent, or non-transparent material may be located between Plasma-spheres to prevent optical cross-talk between Plasma-spheres, particularly between adjacent Plasma-spheres. A black material such as carbon filler is typically used.

Luminescent Substances

The Plasma-sphere may also contain luminescent materials such as phosphor(s). The phosphor may be a continuous or discontinuous layer or coating on the interior or exterior of the shell. Phosphor particles may also be introduced inside the Plasma-sphere by dispersing phosphors in the gas fill stream.

Green Phosphor

A green light-emitting phosphor may be used alone or in combination with other light-emitting phosphors such as blue or red. Phosphor materials which emit green light include $Zn_2SiO_4:Mn$, $ZnS:Cu$, $ZnS:Au$, $ZnS:Al$, $ZnO:Zn$, $CdS:Cu$, $CdS:Al_2$, $Cd_2O_2S:Tb$, and $Y_2O_2S:Tb$.

In one mode and embodiment of this invention using a green light-emitting phosphor, there is used a green light-emitting phosphor selected from the zinc orthosilicate phosphors such as $ZnSiO_4:Mn^{2+}$. Green light emitting zinc orthosilicates including the method of preparation are disclosed in U.S. Pat. No. 5,985,176 (Rao) which is incorporated herein by reference. These phosphors have a broad emission in the green region when excited by 147 nm and 173 nm (nanometers) radiation from the discharge of a xenon gas mixture.

In another mode and embodiment of this invention there is used a green light-emitting phosphor which is a terbium activated yttrium gadolinium borate phosphor such as $(Gd, Y)BO_3:Tb^{3+}$. Green light-emitting borate phosphors including the method of preparation are disclosed in U.S. Pat. No. 6,004,481 (Rao), which is incorporated herein by reference.

In another mode and embodiment there is used a manganese activated alkaline earth aluminate green phosphor as disclosed in U.S. Pat. No. 6,423,248 (Rao), peaking at 516 nm when excited by 147 and 173 nm radiation from xenon. The particle size ranges from 0.05 to 5 microns. Rao ('248) is incorporated herein by reference Terbium doped phosphors may emit in the blue region especially in lower concentrations of terbium. For some display applications such as television, it is desirable to have a single peak in the green region at 543 nm. By incorporating a blue absorption dye in a filter, any blue peak can be eliminated.

Green light-emitting terbium-activated lanthanum cerium orthophosphate phosphors are disclosed in U.S. Pat. No. 4,423,349 (Nakajima et al.), which is incorporated herein by reference. Green light-emitting lanthanum cerium terbium phosphate phosphors are disclosed in U.S. Pat. No. 5,651,920 (Chau et al.), incorporated herein by reference.

Green light-emitting phosphors may also be selected from the trivalent rare earth ion-containing aluminate phosphors as disclosed in U.S. Pat. No. 6,290,875 (Oshio et al.).

Blue Phosphor

A blue light-emitting phosphor may be used alone or in combination with other light-emitting phosphors such as green or red. Phosphor materials which emit blue light include $ZnS:Ag$, $ZnS:Cl$, and $CsI:Na$.

In a preferred mode and embodiment of this invention, there is used a blue light-emitting aluminate phosphor. An aluminate phosphor which emits blue visible light is divalent europium ($Eu^{2+}$) activated Barium Magnesium Aluminate (BAM) represented by $BaMgAl_{10}O_{17}:Eu^{2+}$. BAM is widely used as a blue phosphor in the PDP industry.

BAM and other aluminate phosphors, which emit blue visible light, are disclosed in U.S. Pat. Nos. 5,611,959 (Kijima et al.) and 5,998,047 (Bechtel et al.), both incorporated herein by reference. The aluminate phosphors may also be selectively coated as disclosed by Bechtel et al. ('047).

Blue light-emitting phosphors may be selected from a number of divalent europium-activated aluminates such as disclosed in U.S. Pat. No. 6,096,243 (Oshio et al.), incorporated herein by reference.

The preparation of BAM phosphors for a PDP is also disclosed in U.S. Pat. No. 6,045,721 (Zachau et al.), incorporated herein by reference.

In another mode and embodiment of this invention, the blue light-emitting phosphor is thulium activated lanthanum phosphate with trace amounts of $Sr^{2+}$ and/or $Li^+$. This exhibits a narrow band emission in the blue region peaking at 453 nm when excited by 147 nm and 173 nm radiation from the discharge of a xenon gas mixture. Blue light-emitting phosphate phosphors including the method of preparation are disclosed in U.S. Pat. No. 5,989,454 (Rao), incorporated herein by reference.

In a best mode and embodiment of this invention using a blue light-emitting phosphor, a mixture or blend of blue light-emitting phosphors is used such as a blend or complex of about 85% to 70% by weight of a lanthanum phosphate phosphor activated by trivalent thulium ($Tm^{3+}$), $Li^+$, and an optional amount of an alkaline earth element ($AE^{2+}$) as a coactivator and about 15% to 30% by weight of divalent europium-activated BAM phosphor or divalent europium-activated Barium Magnesium, Lanthanum Aluminated (BLAMA) phosphor. Such a mixture is disclosed in U.S. Pat. No. 6,187,225 (Rao), incorporated herein by reference.

Blue light-emitting phosphors also include $ZnO.Ga_2O_3$ doped with Na or Bi. The preparation of these phosphors is disclosed in U.S. Pat. Nos. 6,217,795 (Yu et al.) and 6,322,725 (Yu et al.), both incorporated herein by reference.

Other blue light-emitting phosphors include europium activated strontium chloroapatite and europium-activated strontium calcium chloroapatite.

Red Phosphor

A red light-emitting phosphor may be used alone or in combination with other light-emitting phosphors such as green or blue. Phosphor materials which emit red light include $Y_2O_2S$:Eu and $Y_2O_3S$:Eu.

In a best mode and embodiment of this invention using a red light-emitting phosphor, there is used a red light-emitting phosphor which is an europium activated yttrium gadolinium borate phosphors such as $(Y,Gd)BO_3$:$Eu^{3+}$. The composition and preparation of these red light-emitting borate phosphors is disclosed in U.S. Pat. Nos. 6,042,747 (Rao) and 6,284,155 (Rao), both incorporated herein by reference.

These europium activated yttrium, gadolinium borate phosphors emit an orange line at 593 nm and red emission lines at 611 nm and 627 nm when excited by 147 nm and 173 nm UV radiation from the discharge of a xenon gas mixture. For television (TV) applications, it is preferred to have only the red emission lines (611 nm and 627 nm). The orange line (593 nm) may be minimized or eliminated with an external optical filter.

A wide range of red light-emitting phosphors are used in the PDP industry and are contemplated in the practice of this invention including europium-activated yttrium oxide.

Other Phosphors

There also may be used phosphors other than red, blue, green such as a white light-emitting phosphor, pink light-emitting phosphor or yellow light-emitting phosphor. These may be used with an optical filter.

Phosphor materials which emit white light include calcium compounds such as $3Ca_3(PO_4)_2.CaF$:Sb, $3Ca_3(PO_4)_2.CaF$:Mn, $3Ca_3(PO_4)_2.CaCl$:Sb, and $3Ca_3(PO_4)_2.CaCl$:Mn.

White light-emitting phosphors are disclosed in U.S. Pat. No. 6,200,496 (Park et al.), incorporated herein by reference.

Pink light-emitting phosphors are disclosed in U.S. Pat. No. 6,200,497 (Park et al.), incorporated herein by reference. Phosphor material which emits yellow light includes ZnS:Au.

Photon Exciting of Luminescent Substance

In one embodiment contemplated in the practice of this invention, a layer, coating, or particles of luminescent substance such as phosphor is located on the exterior wall of the Plasma-sphere. The photons of light pass through the shell or wall(s) of the Plasma-sphere and excite phosphor located outside of the Plasma-sphere. The phosphor may be located on the side wall(s) of a slot, channel, barrier, groove, cavity, hole, well, hollow or like structure of the discharge space.

In one embodiment, the gas discharge within the slot, channel, barrier, groove, cavity, hole, well or hollow produces photons that excite the phosphor such that the phosphor emits light in a range visible to the human eye. Typically this is red, blue, or green light. However, phosphors may be used which emit other light such as white, pink, or yellow light. In some embodiments of this invention, the emitted light may not be visible to the human eye.

In prior art AC plasma display structures as disclosed in U.S. Pat. Nos. 5,793,158 (Wedding) and 5,661,500 (Shinoda), phosphor is located on the wall(s) or side(s) of the barriers that form the channel, groove, cavity, well, or hollow. Phosphor may also be located on the bottom of the channel, or groove as disclosed by Shinoda et al. ('500) or in a bottom cavity, well, or hollow as disclosed by Knauer et al. ('186). The Plasma-spheres are positioned within the channel barrier, groove, cavity, well or hollow so as to be in close proximity to the phosphor.

Thus in one embodiment of this invention, Plasma-spheres are positioned within the channels, barriers, grooves, cavities, wells, or hollows, such that photons from the gas discharge within the Plasma-sphere cause the phosphor along the wall (s), side(s) or at the bottom of the channel, barrier, groove, cavity, well, or hollow, to emit light in the visible and/or invisible range.

In another embodiment of this invention, phosphor is located on the outside surface of each Plasma-sphere. In this embodiment, the outside surface is at least partially covered with phosphor that emits light in the visible and/or invisible range when excited by photons from the gas discharge within the Plasma-sphere.

In another embodiment, phosphor is dispersed and/or suspended within the ionizable gas inside each Plasma-sphere. In such embodiment, the phosphor particles are sufficiently small such that most of the phosphor particles remain suspended within the gas and do not precipitate or otherwise substantially collect on the inside wall of the Plasma-sphere. The average diameter of the dispersed and/or suspended phosphor particles is less than about 5 microns, typically less than 0.1 microns. Larger particles can be used depending on the size of the Plasma-sphere. The phosphor particles may be introduced by means of a fluidized bed.

The luminescent substance such as a photoluminescent phosphor may be located on all or part of the external surface of the Plasma-spheres and/or on all or part of the internal surface of the Plasma-spheres. The phosphor may comprise particles dispersed or floating within the gas.

The phosphor(s) thickness is sufficient to absorb the UV, but thin enough to emit light with minimum attenuation. Typically the phosphor(s) thickness is about 2 to 40 microns, preferably about 5 to 15 microns.

Dispersed or floating particles within the gas are typically spherical or needle shaped having an average size of about 0.01 to 5 microns.

Because the ionizable gas is contained within a multiplicity of Plasma-spheres, it is possible to provide a custom gas mixture or composition at a custom pressure in each Plasma-sphere for each phosphor.

In the prior art, it is necessary to select an ionizable gas mixture and a gas pressure that is optimum for all phosphors used in the device such as red, blue, and green phosphors. However, this requires trade-offs because a particular gas mixture may be optimum for a selected green phosphor, but less desirable for selected red or blue phosphors. In addition, trade-offs are required for the gas pressure.

Tinted Plasma-Spheres

In the practice of this invention the Plasma-sphere may be color tinted or constructed of materials that are color tinted with red, blue, green, yellow, or like pigments. This is disclosed in U.S. Pat. No. 4,035,690 (Roeber), incorporated herein by reference. The gas discharge may also emit color light of different wavelengths as disclosed in Roeber ('690).

The use of tinted materials and/or gas discharges emitting light of different wavelengths may be used in combination with phosphors and the light emitted from such phosphors. Optical filters may also be used.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. An apparatus for forming and ejecting on demand a discrete liquid droplet that is characterized by a hollow shell, the center of which contains a select fill-gas, said apparatus containing a concentric arrangement of a liquid nozzle and a fill-gas nozzle with means to apply, control and synchronize pressure impulses to each nozzle independently, said apparatus comprising:
   an enclosed vessel having an interior for containing a liquid supply with pressure regulation, an impulse pressure generation chamber, and a liquid droplet discharge region containing an orifice;
   a liquid pressure impulse device that provides a physical impulse to the pressure generating chamber through the momentary compression of one of the impulse generating pressure chamber walls, said compressible wall of the pressure chamber including a flexible diaphragm member;
   a vessel having an interior for containing the fill-gas supply, gas pressure regulator, impulse pressure valve, and a gas discharge region through an orifice that is concentric with the liquid discharge orifice; and
   a fill-gas impulse pressure generator that provides a physical impulse of fill-gas in synchronism with the liquid ejection pressure impulse that cooperates to produce a gas filled hollow droplet from the orifice, said fill-gas impulse generator including a piezo-electric actuator valve that responds to electrical pulse generator signals to produce fill-gas pressure impulses in synchronism with fluid ejection pressure pulses.

2. The apparatus of claim 1 wherein there is provided a fluid impulse generator that includes a piezo-electric actuator that converts the electrical signal from an electrical pulse generator into a physical force that mechanically compresses one of the walls of the fluid pressure chamber causing a droplet of fluid to be ejected from the nozzle orifice.

3. The apparatus of claim 1 wherein there is provided a fluid impulse generator that includes a loudspeaker type voice-coil actuator that converts the electrical signal from an electrical pulse generator into a physical force that mechanically compresses one of the walls of the fluid pressure chamber to eject a fluid droplet from the nozzle.

4. The apparatus of claim 1 wherein there is provided a fluid impulse generator that includes a thermal actuator that converts the electrical signal from an electrical pulse generator into a physical force that mechanically compresses one of the walls of the fluid pressure chamber to eject a fluid droplet from the nozzle.

5. The apparatus of claim 1 in which the fill-gas impulse generator includes a loudspeaker type voice coil actuator valve that responds to electrical pulse generator signals to produce fill-gas pressure impulses in synchronism with fluid ejection pressure pulses.

6. The apparatus of claim 1 wherein there is provided a fluid impulse generator with signal timing and duration, said signal timing and duration being synchronized to optimize hollow droplet formation.

7. Apparatus for forming and ejecting on demand a discrete high temperature liquid droplet that is characterized by a hollow shell containing a select fill-gas, said apparatus containing a concentric arrangement of a liquid nozzle and a fill-gas nozzle with means to apply, control and synchronize pressure impulses to each nozzle independently, said apparatus containing impulse actuator temperature insulating drive members to communicate between impulse actuators mounted outside a high temperature furnace enclosure so as to produce liquid and gas pressure impulse pressures inside of the furnace, said apparatus comprising:
   a vessel having an interior for containing the high temperature liquid supply with pressure regulation, an impulse pressure generation chamber, and a liquid droplet discharge region containing an orifice;
   a liquid pressure impulse device that provides a physical impulse to the high temperature pressure generating chamber through the momentary compression of one of the impulse generating pressure chamber walls that includes a flexible diaphragm member;
   a vessel having an interior for containing the high temperature fill-gas supply, gas pressure regulator, impulse pressure valve, and a gas discharge region through an orifice that is concentric with the liquid discharge orifice;
   a fill-gas impulse pressure generator that provides a physical impulse of fill-gas in synchronism the liquid ejection pressure impulse that cooperates to produce a high temperature gas filled hollow droplet from the orifice said fill-gas impulse generator including a piezo-electric actuator valve that responds to electrical pulse generator signals to produce fill-gas pressure impulses in synchronism with fluid ejection pressure pulses.

8. The apparatus of claim 7 wherein there is provided a fluid impulse generator that includes a piezo-electric actuator that converts the electrical signal from an electrical pulse generator into a physical force that mechanically compresses one of the walls of the high temperature fluid pressure chamber causing a droplet of fluid to be ejected from the nozzle orifice.

9. The apparatus of claim 7 wherein there is provided a fluid impulse generator that includes a loudspeaker type voice-coil actuator that converts the electrical signal from an electrical pulse generator into a physical force that mechanically compresses one of the walls of the high temperature fluid pressure chamber to eject a fluid droplet from the nozzle.

10. The apparatus of claim 7 wherein there is provided a impulse generator that includes a thermal actuator that converts the electrical signal from an electrical pulse generator into a physical force that mechanically compresses one of the walls of the high temperature fluid pressure chamber to eject a fluid droplet from the nozzle.

11. The apparatus of claim 7 in which the fill-gas impulse generator includes a loudspeaker type voice coil actuator valve that responds to electrical pulse generator signals to produce fill-gas pressure impulses in synchronism with fluid ejection pressure pulses.

12. The apparatus of claim 7 wherein there is provided a fluid impulse generator with signal timing and duration, said signal timing and duration being synchronized to optimize hollow droplet formation.

* * * * *